Figure 1:
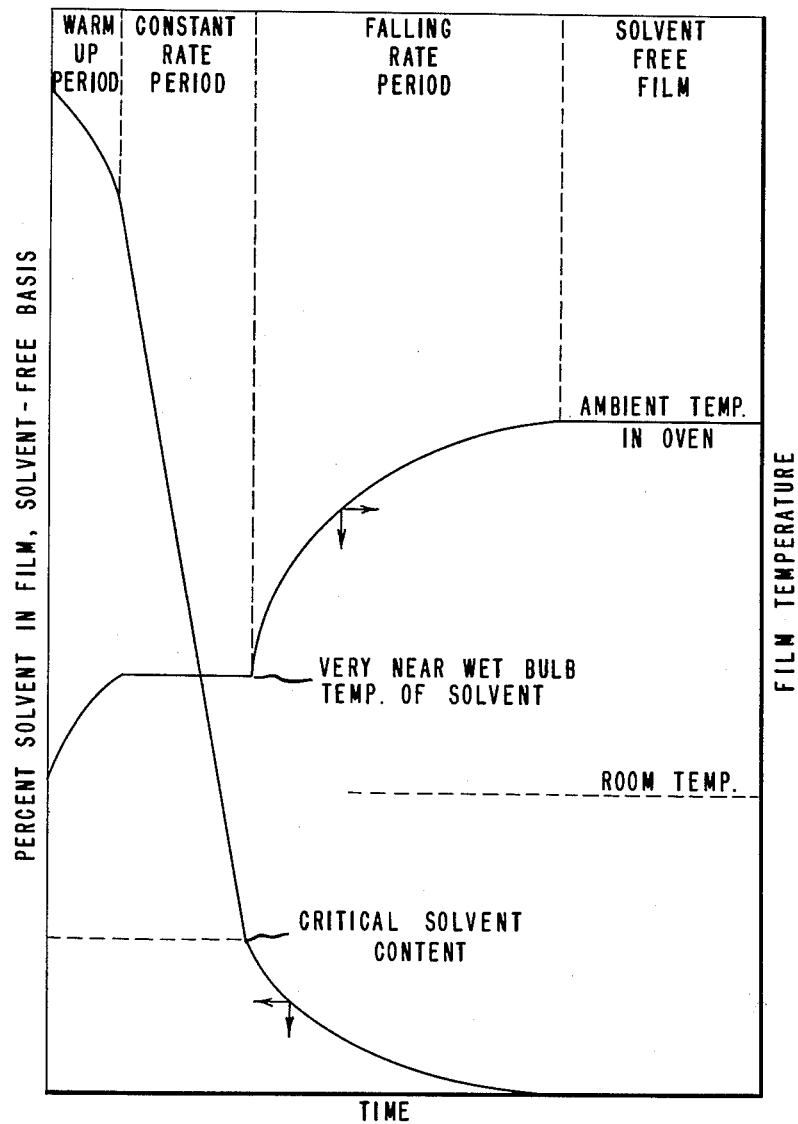

DRYING OF LATENT SOLVENT-CONTAINING POLYVINYL FLUORIDE FILMS

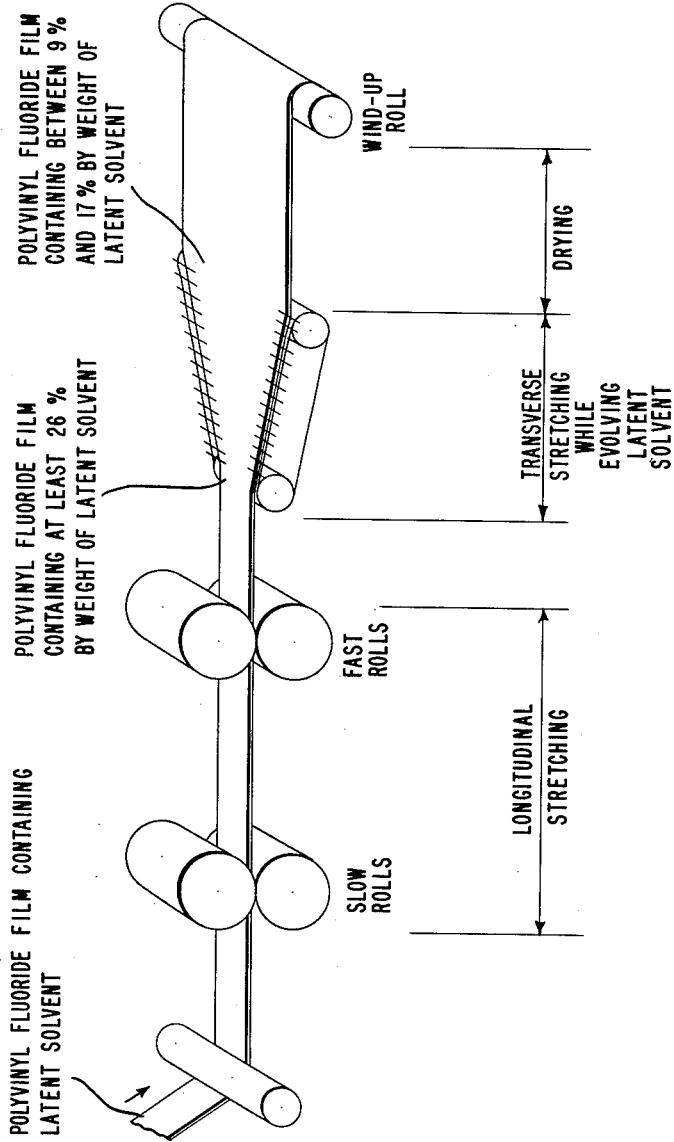

United States Patent Office 3,139,470
Patented June 30, 1964

3,139,470
PROCESS FOR PREPARING ORIENTED, ORGANIC, THERMOPLASTIC POLYMERIC FILM
Robert Smith Prengle, Buffalo, N.Y., and Robert Laurence Richards, Jr., Clinton, Iowa, assignors to E. I. du Pont de Nemours and Company, Wilmington, Del., a corporation of Delaware
Filed May 3, 1963, Ser. No. 277,820
14 Claims. (Cl. 264—289)

This invention relates to organic, thermoplastic, polymeric film, and more particularly to a process for preparing oriented film of polyvinyl fluoride of high molecular weight. This application is a continuation-in-part of our copending application Serial No. 801,441, filed March 24, 1959.

The preparation of orientable polyvinyl fluorides is described in U.S.P. 2,419,008, 2,419,010, 2,510,783 and 2,599,300. Polymers prepared according to these procedures have attractive properties, and in film form possess an unusual combination of excellent resistance to outdoor weathering exposures, a high degree of physical toughness, chemical inertness, transparency and retention of properties at both low and elevated temperatures. These properties are manifested to an especially high degree in film derived from polymers of relatively high molecular weight. However, in order to compete more favorably in fields embracing certain end uses, notably those wherein a high degree of physical toughness and the ability to maintain it under outdoor weathering exposures are of primary importance, it has been necessary to devise some means of upgrading the property levels available in the above-mentioned films.

There is much art disclosing methods for upgrading the properties of films of thermoplastic polymers. Notable among these are various techniques by which films are elongated in either one direction or in two directions mutually perpendicular. In general, such procedures result in an increase in such properties as tensile and impact strengths and tensile modulus. Biaxial elongation of thermoplastic polymer film also frequently may result in a decrease in permeability to gases, water and solvent vapors, as well as an improvement in electrical properties and chemical resistance.

While it has been evident that in this respect orientable polyvinyl fluoride behaves as do many other thermoplastic polymers, attempts to elongate, and particularly attempts to biaxially elongate high molecular weight, orientable polyvinyl fluoride films by any of the usual drawing techniques, have met with substantial failure. For example, first attempts to elongate polyvinyl fluoride were made at relatively low temperatures; e.g., below 100° C. In this temperature range, orientable polyvinyl fluoride film was found to exhibit the phenomenon of line drawing, i.e., thickness reduction, instead of occurring uniformly over the entire distance between the lines of stress application, takes place over a relatively short distance along a line running across the film width perpendicular to the direction in which the stress is applied. With line drawing, control of thickness uniformity is extremely difficult, if not practically impossible, even on laboratory scale equipment and frequently results in holes or tears.

In addition to the problems presented by its tendency to line draw, orientable polyvinyl fluoride film, after being elongated in one direction, showed a serious tendency to fibrillate along lines paralleling the direction of this initial elongation when subjected to tension in a direction substantially at right angles thereto. This tendency to fibrillate became more pronounced as the film thickness reduction ratio increased. Further problems in stretching polyvinyl fluoride arise from the circumstance that polyvinyl fluoride, unlike many other normally crystalline thermoplatsic polymers apparently cannot be obtained in the amorphous state by rapidly quenching the polymer heated above its crystalline melting point. It is well known, of course, that as the degree of crystallinity of a polymeric film increases, the stretching forces required to elongate the film also increase at an accelerated rate.

It was found that the tendency to line draw could be minimized by operating at higher temperatures. However, as operating temperatures rose above 100° C. and stretching became more uniform, the tendency to fibrillate increased rapidly. Operating at relatively low thickness reduction ratios, i.e., relatively small amounts of elongation, in order to avoid fibrillation, did not result in sufficient reinforcement of film property levels.

The primary object of this invention, therefore, is to provide an economical, commercially practicable process for orienting, by elongation, an orientable, relatively high molecular weight polyvinyl fluoride film to upgrade its properties while avoiding the difficulties of line drawing and fibrillation above described. Another object is to provide a continuous stretching process for producing oriented film of relatively high molecular weight polyvinyl fluoride. Still another object is to provide an economical process for uniformly biaxially setretching film of orientable, relatively high molecular weight polyvinyl fluoride. These and related objects will more clearly appear from the description which follows.

The foregoing objects are realized by the present invention which, briefly stated, comprises elongating at least 50%, e.g., by stretching (drawing), a film of a polyvinyl fluoride having an inherent viscosity of at least 0.5, said film containing initially from 26% to 80% by weight of latent solvent, preferably above 35%, based on the total weight, homogeneously (uniformly) distributed therein and evolving therefrom said latent solvent during transverse stretching so that the amount of latent solvent remaining in the film at the completion of transverse stretching constitutes an amount between 9% and 17% by weight, based on the total weight; and, thereafter, driving off the remaining solvent (normally to less than 0.5% by weight), preferably by heating while restraining the biaxially stretching film. FIGURE 2 of the drawing is a schematic illustration of a convenient arrangement of apparatus for carrying out one embodiment of the process in a continuous manner.

The term "latent solvent" as used herein is defined as an organic liquid, chemically inert with respect to polyvinyl fluoride, and having no significant solvent or swelling action on polyvinyl fluoride at room temperature but being capable at an elevated temperature below its normal boiling point of solvent action sufficient to cause polyvinyl fluoride particles to coalesce.

The latent solvent need not be a liquid at room temperature. It should be thermally stable up to its normal boiling point, or at least up to the temperatures to which it will be subjected during the process of this invention. It should not react chemically with either the polymer or the materials of construction of the process equipment over the expected temperature range, and it should not tend to autopolymerize within the range of process conditions.

Because of its low cost, low toxicity, commercial availability, etc. gamma-butyrolactone is the preferred latent solvent in the process of this invention. Other preferred latent solvents are N,N-dimethylacetamide, N,N-dimethylformamide, dimethylsulfoxide, N-methyl-2-pyrrolidone and gamma-valerolactone. In addition to these, the following are examples of specific compounds representative of the class of latent solvents useful in the process of the present invention: butadiene cyclic sulfone, tetramethylene sulfone, dimethylsulfolane, hexamethylenesulfone, diallylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethyl-gamma - hydroxyacetamide, N,N - dimethyl - gamma - hydroxybutyramide, N,N-dimethyllactamide, N,N-dimethylmethoxyacetamide, N-methlacetamide, N-methylformamide, N,N-dimethylaniline, N,N-dimethylethanolamine, 2-piperidone, N-methyl-2-piperidone, N-ethyl-2-pyrrolidone, N-isopropyl - 2 - pyrrolidone, 5-methyl - 2 - pyrrolidone, beta-propiolactone, delta-valerolactone, alpha-angelicalactone, beta-angelicalactone, epsilon-caprolactone, and alpha, beta and gamma-substituted alkyl derivatives of gamma-butyrolactone, gamma-valerolactone and delta-valerolactone, as well as delta-substituted alkyl derivatives of delta-valerolactone, tetramethyl urea, 1-nitropropane, 2-nitropropane, acetonyl acetone, acetophenone, acetyl acetone, cyclohexanone, diacetone alcohol, dibutyl ketone, isophorone, mesityl oxide, methylamyl ketone, 3-methyl-cyclohexanone, bis-(methoxymethyl)uron, methylacetylsalicylate, diethyl phosphate, dimethyl phthalate, ethyl acetoacetate, methylbenzoate, methylene diacetate, methyl salicylate, phenyl acetate, triethyl phosphate, tris(morpholino) phosphine oxide, N - acetylmorpholine, N - acetylpiperidine, isoquinoline, quinoline, pyridine and tris(dimethylamido)phosphate.

Vinyl fluoride polymer operable in the process of this invention, in addition to homopolymers of vinyl fluoride, may embrace copolymers of vinyl fluoride with other mono-ethylenically unsaturated monomers copolymerizable therewith, wherein the vinyl fluoride is present in substantial or major amounts, i.e., at least 75% to 80% of the total by weight. Examples are mono-ethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1 - difluoroethylene, difluorochloroethylene, trifluorochloroethylene, tetrafluoroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, and vinyl esters of inorganic acids; vinyl ethers, e.g. vinyl ethyl ether, tetrafluoroethylallyl ether and vinyl dioxolane; vinyl ketones, e.g., methyl vinyl ketone; N-vinyl imides, e.g, N-vinyl succinimide and N-vinyl phthalimide; acrylic and methacrylic acids and their derivatives, e.g., esters, amides, anhydrides and acid halides, including methyl methacrylate, beta-hydroxyethyl methacrylate, allyl methacrylate, N-butyl methacrylamide, etc.; derivatives of maleic and fumaric acids, e.g., diethylmaleate and dimethylfumarate; propenyl esters, e.g., allyl acetate, isopropenyl acetate, etc.

From the standpoint of producing a film with optimum property levels, it is preferred to employ in the process of this invention film made from orientable polyvinyl fluoride of as high a molecular weight as possible. Films made from polymer ranging in inherent viscosity [1] from approximately 0.5 up to greater than 5.0 have been successfully employed. However, polymer ranging in inherent viscosity from 1.0 to 3.5 provides the optimum balance between property levels of finished film and process economics.

It is not possible to two-way stretch continuously, and at commercially acceptable rates, a polyvinyl fluoride film containing initially less than 26% latent solvent without producing line drawing. The maximum permissible solvent content is that above which the film ceases to be self-supporting at any given operable temperature. In the continuous stretching process, solvent concentrations in the range of 35% to 70% are preferred. These concentrations provide a good balance between throughput rate of finished film and stretching operability from the standpoint of minimizing film tears while running through the equipment, maintaining good thickness uniformity in the finished product and obtaining a satisfactory property level.

Furthermore, to maintain good thickness uniformity, it is critical to evolve solvent at a specified predetermined rate during the transverse stretching step. Specifically, at the end of the transverse stretching step, whether accomplished simultaneously with or sequentially after the longitudinal stretching step, the latent solvent content of the polyvinyl fluoride film must be reduced to a critical solvent content for that particular combination of polyvinyl fluoride and latent solvent. This will be about 13% by weight (wet basis) for the preferred latent solvents, and will lie within the range of 9–16.7% by weight (wet basis) for the known latent solvents.

Once uniform stretching has been initiated in a latent solvent-containing polyvinyl fluoride film, the solvent content may be reduced (while stretching continues) to a concentration below that originally necessary to prevent line drawing at start-up, i.e., to the critical solvent content, without resulting in line drawing. Advantage is taken of this fact to evolve solvent from the film during the transverse direction stretch to minimize the solvent removal load in the drying zone.

Latent solvent-containing polyvinyl fluoride film suitable for purposes of this invention may be prepared by any convenient expedient. A preferred latent solvent-containing polyvinyl fluoride film is that made in accordance with the process described and claimed in the copending application of L. R. Bartron, Serial No. 715,394, filed February 14, 1958, now Patent No. 2,953,818. In this process a suitably proportioned mixture of particles of high molecular weight, orientable polyvinyl fluoride and latent solvent are heated until the particles coalesce to form a single phase fluid composition which is then extruded as a film. Coffman et al., U.S.P. 2,419,008 and 2,419,010, and Austin, U.S.P. 2,423,749, relate to the preparation of orientable polyvinyl fluoride and show the formation of solvent-free films by casting of low polymer content hot solutions. Latent solvent-containing films could be made by casting films from solutions of this type and then evolving only a portion of the solvent originally present. Further, latent solvent-containing, self-supporting films of orientable polyvinyl fluoride may be made by spreading a polymer/latent solvent mixture on a smooth, flat, non-adherent surface, e.g., a plate, an endless belt, a drum, etc., subjecting the mixture to a temperature high enough to cause the polymer particles to coalesce, quenching the resulting gel film by immersion in or spraying with cold water, and stripping from the aforementioned smooth surface.

Pigments, fillers and the like may be incorporated in latent solvent-containing polyvinyl fluoride films suitable for purposes of this invention by introducing said pigments, fillers, etc. at any convenient stage in any of the above-described methods by which such films may be prepared. Among pigments which may be successfully incorporated into these films may be mentioned basic zinc chromate, titanium dioxide, oxides of iron, phthalocyanine greens and blues, chrome green, chrome yellow, etc.

The process of this invention may be carried out to elongate a latent solvent-containing polyvinyl fluoride film by stretching or drawing techniques common in the art. It should be understood that, for the purpose of this invention, the terms stretching and drawing are intended to embrace the technique of expanding a tubular polymeric structure by fluid pressure. When film is to be elongated in two mutually perpendicular directions according to the process of this invention, elongation in these two directions may be accomplished either simultaneously or sequentially by techniques well known in the art.

Preferably the process is carried out by continuously

---

[1] Measured at 30° C. in a solution of hexamethylphosphoramide having a polymer concentration of 0.05 g./100 ml.

stretching the latent solvent-containing polyvinyl fluoride film sequentially in each of two mutually perpendicular directions at least 50% but not more than 500% in either direction. This may be done by first stretching at least 50% but not more than 500% in a longitudinal direction followed by stretching at least 50% but not more than 500% in the transverse direction.

When carrying out the process to stretch first longitudinally and then transversely, it is preferred to carry out the longitudinal stretching at an ambient temperature in the range of 20° C. to 100° C. and the transverse stretching at an ambient temperature in the range of 40° C. to 150° C., preferably 60° C. to 150° C. These temperatures should be considered as guides since reducing the latent solvent content of the polyvinyl fluoride film below the 26% level during the longitudinal stretching should be avoided in order that line drawing will not be initiated during the transverse stretching.

When carrying out the process to stretch simultaneously, it is preferred to operate at an ambient temperature in the range of 20° C. to 150° C. Uniform stretching (without line drawing) is initiated simultaneously in both the longitudinal and transverse directions and the latent solvent content is reduced at such a rate that the critical solvent content is reached simultaneously with the completion of the stretching step.

Substantially all of the solvent remaining in the film after elongation is removed in a final drying operation; for example, subjecting the elongated film in air to a temperature and for a time sufficient to volatilize the remaining latent solvent from the film. The film may be heat-set simultaneously with or subsequent to drying. Ambient air temperatures in the range of 100 to 210° C. for drying may be employed. However, if the temperature of the solvent-free film is allowed to exceed about 180° C., much orientation may be lost if the film is not restrained. With film properly restrained, a stream of air at a temperature in the vicinity of 200° C. (200–220° C.) may be employed for volatilizing latent solvent from the biaxially elongated, oriented film. The temperature selected for this drying will depend at least in part on the available rate of air supply, the width, thickness, and solvent content of the film, the nature of the specific solvent and the residence time of the film in the drying operation.

Although drying under restraint is preferred, some controlled shrinkage may be advantageous. If it is desired to produce a biaxially stretched solvent-free polyvinyl fluoride film of increased stability to dimensional changes on thermal exposure, this may be accomplished by allowing the film to relax a controllable portion ranging up to 35% of the elongation imparted initially in either or both of the mutually perpendicular stretching directions.

If it is desired to produce a biaxially stretched solvent-free polyvinyl fluoride film exhibiting a substantially higher tensile strength in one direction of stretch, e.g., the longitudinal direction, than in the other, this may be accomplished by stretching the film, in the direction in which the higher tensile strength is desired, to a greater extent than is normally required to produce a film of substantially balanced tensile properties. For example, a polyvinyl fluoride film suitable for use as a base for adhesive or ferromagnetically susceptible coatings employed in the manufacture of adhesive tapes or magnetic recording tapes may be produced by stretching a latent solvent-containing polyvinyl fluoride film first longitudinally and then transversely, the extent of longitudinal stretching being greater than that normally required to produce a film of substantially balanced tensile properties. Alternatively, such a film may be produced by stretching first longitudinally and then transversely to approximately the amounts which customarily produce substantially balanced tensile properties, and then subsequently stretching a small additional amount in the longitudinal direction.

In any case, as mentioned previously, it is important to initiate stretching on a film containing a substantial amount of latent solvent and to evolve solvent during transverse stretching so that the film at the completion of transverse stretching has the "critical solvent content." A method for determining the "critical solvent content" of polyvinyl fluoride film for any particular latent solvent follows:

A 6-inch by 6-inch piece of the solvent-containing polyvinyl fluoride film in question is tentered on a pin-studded square metal frame and the frame is suspended in a natural convection laboratory oven by a hook-ended wire of suitable length passing up through the vent hole in the top of the oven, the other end of which is hooked over the stirrup at the load end of a laboratory beam balance, the pan having first been removed and the balance properly tared with the hook-ended wire and frame. After recording an initial sample weight, the oven is turned on and a timer started.

Periodically during the heating of the sample, the beam is unbalanced by removing a suitable small weight increment and then the elapsed time is recorded when the beam pointer subsequently swings back down through the balance point as the film sample loses additional weight. The sample weight is also recorded for each such time reading. This continues until the sample attains a constant (i.e., solvent-free) weight, which is also recorded.

Now, having the weight of the solvent-free film, the original solvent content (i.e., $$\frac{\text{Weight of solvent}}{\text{Weight of solvent-free film}}$$

expressed as a percent) and that at any time interval may readily be calculated. An arithmetic plot of percent solvent (solvent-free basis) as the ordinate versus time as the abscissa is then prepared from the data thus obtained. This will generally consist of a straight line portion of negative slope (possibly preceded by a brief curved portion of gradually increasing negative slope if there is any appreciable warm-up period) running from the original solvent at zero time to a lower percent solvent at some finite time, followed by a curved portion of gradually decreasing negative slope which eventually reaches the abscissa (zero solvent content) at some later finite time.

The "critical solvent content" is that at the inflection point of the curve where the straight line portion representing the period during which evaporative mechanisms are controlling and wherein solvent is being evolved from the sample at a constant rate meets the curved portion of decreasing slope representing the period during which diffusional and other mechanisms are controlling and solvent is being evolved from the sample at a gradually decreasing rate.

A typical drying rate plot of solvent content versus time is shown in FIGURE 1, accompanied on the same figure by a correspondingly typical plot of film temperature versus time. During the constant rate period, drying may be visualized as evaporation from a free solvent surface. During this period the drying rate is at a maximum (steepest slope) and the film temperature is substantially constant at (or very near) the wet bulb temperature of the latent solvent at the ambient air temperature in the oven. Although wet bulb depression exerts the major control over film temperature during the constant rate period, radiation effects from the surrounding equipment may contribute to elevating the film temperature slightly above the normal wet bulb temperature under the prevailing ambient conditions.

During the falling rate period, the temperature of the film rises rapidly, approaching the ambient air temperature as the film becomes solvent-free.

Over a large number of determinations made on polyvinyl fluoride films containing either gamma-butyrolactone or N,N-dimethylacetamide, the inflection point of these curves was found to occur within the range of 10–20% solvent (solvent-free basis) or 9–16.7% (wet basis) averaging about 15% solvent (solvent-free basis) or 13% solvent (wet basis).

For these determinations, the oven may be set at any temperature within a wide range. Quite obviously, the lower temperature settings will permit more data points to be determined since the experiment will run for a longer period of time.

Having determined the critical solvent content for polyvinyl fluoride film for a particular latent solvent, one skilled in the art may now provide a suitable technique to determine whether a particular apparatus configuration and set of stretching conditions will in fact cause the polyvinyl fluoride film being stretched to reach the critical solvent content just at the end of transverse stretching.

This may be accomplished by employing a monochromatic infrared continuous analyzer (such as are avilable commercially from Bechman Instruments, Inc., Fullerton, California, and Perkin-Elmer Corp., Norwalk, Connecticut) positioned at the intersection of the center line of the film and a line drawn transversely of the film at the end of the transverse stretching section of the film stretching apparatus with its radiant source and receiver in close proximity to and on opposite sides of the film.

A monochromatic wave length is chosen that is selectively absorbed by the latent solvent being used without interference from the polyvinyl fluoride film itself. If the fundamental absorbance band of the solvent is so intense that the sensitivity of the instrument does not permit detection in the necessary range of solvent contents, a first or even a second overtone absorbance band of the solvent may be employed after first turning the radiant source to the appropriate monochromatic wave length.

Such an instrument may be calibrated for different thicknesses of film. The accompanying recording strip chart may be calibrated to read directly in absorbance, i.e., solvent concentration.

If during a specific trial the chart reading indicates that the solvent content of the film traversing the analyzer is higher than the critical solvent content, solvent can be removed more rapidly by increasing the air supply to that portion of the stretching apparatus or by increasing the temperature of the air being supplied. Alternatively, the speed at which the tenter chain travels through the apparatus may be reduced, thereby increasing the residence time of the film in the stretching zone and thus reducing its exiting solvent content. Any combination of the three may be conveniently practiced. If, on the other hand, the solvent content of the film traversing the infrared analyzer is found to be below the critical solvent content, the converse will apply.

The following illustrative examples constitute specific embodiments of the process of this invention and are not intended to be limitative. Although these examples are directed to the biaxial elongation in mutually perpendicular directions of flat film and sheeting, it should be understood that the process of this invention is equally applicable to the biaxial elongation of shaped film structures produced by tubular extrusion techniques. This biaxial elongation may be performed either simultaneously or sequentially employing any or all of the techniques usual to tubular film processing art.

In the following examples, various property data are reported. The test methods by which these data are obtained are described below.

*Tensile Strength, Elongation and Tensile Modulus* are measured at 23.5° C. and 50% relative humidity. They are determined by elongating a film sample, conditioned for at least 24 hours in the test environment, in an Instron Tensile Tester at a rate of 100% elongation per minute until the sample breaks. The width of each test specimen is ½″ and the initial jaw-to-jaw separation is 1″. *Tensile Strength* is defined as the force per unit area applied at break, expressed in pounds per square inch and calculated from the original cross-sectional area of the film and the total force on the film at break. *Elongation* is the present increase in the length of the sample at break. *Tensile Modulus*, a measure of stiffness, is obtained from the slope of the tensile force/elongation curve at an elongation of 1%. It is calculated by dividing the value of the force on the film at 1% elongation by the original cross-sectional area, then multiplying by 100 in order to correct to unit extension, i.e., 100% elongation.

*Tear Strength* is measured on an Elmendorf tear tester at 23.5° C. and 35% relative humidity. Test specimens measure 2.5″ x 5.0″ each. The tester consists of a stationary jaw and a movable jaw mounted on a pendulum swinging on a substantially frictionless bearing and equipped with a means for measuring the maximum arc through which the pendulum will swing. The force required to extend a precisely prepared cut by tearing is measured by determining the work done in tearing the film through a given distance. The work is determined from the difference in the swing of the pendulum, first free and then impeded by tearing the film. A prepared cut extends from the middle of one of the two longer edges of each test specimen, perpendicular to this edge, for a distance of .81″. This leaves a distance of 1.69″ to be torn. The scale of the Elmendorf tear tester, a standard instrument of the paper industry, reads in terms of grams/1.69″ of tear/16 sheets. Depending on the number of sheets of film torn at one time and their respective thicknesses, scale readings may be converted to grams/1.69″ of tear/mil of thickness. This is frequently expressed as grams Elmendorf/mil or Elmendorf tear strength, grams/mil.

*Impact Strength* is the energy required to rupture a film. It is expressed in kilogram-centimeters/mil of thickness of film sample. *Impact Strength* data reported in the following examples were obtained by a pnematic test method. *Pneumatic Impact Strength* is determined by measuring the velocity of a projectile mechanically accelerated by air pressure, first in free flight and then in a flight impeded by rupturing the test sample. In this test, each test specimen measures 1¾″ x 1¾″. The projectiles are steel balls ½″ in diameter, weighing 8.3 grams. The free and impeded velocities are measured by timing photo-electrically the passage of the steel balls between two light beams set a definite distance apart. Pneumatic Impact Strength is measured as the loss in kinetic energy caused by the rupturing of the test sample. The test is conducted at 23.5° C. and 50% relative humidity on test specimens previously conditioned for 24 hours in this environment.

*Accelerated Weatherability* was determined by mounting several strips of each film to be tested in an artificial weathering device which continuously exposed them to intense ultraviolet radiation in a positively circulating atmosphere comprising air and from 2 to 300 parts per million of ozone. As the source of ultraviolet radiation, a Westinghouse EH-1 400-watt lamp was employed. Film test strips were mounted parallel to and at a distance of about 7 inches from the longitudinal axis of this lamp. The ambient temperature within the apparatus ranged from 40° C. to 50° C. Although not specifically regulated, the relative humidity within the apparatus did not exceed about 20%. Strips of each test film were removed at varying intervals and their elongations measured on the Instron Tensile Tester by the previously described method. Accelerated Weatherability was determined as the number of hours of exposure to the above conditions necessary to reduce the elongation-at-break of any film strip tested to in the vicinity of 10%.

EXAMPLE 1

An 11 inch wide roll of orientable polyvinyl fluoride film, 14 mils thick, containing 60% by weight of gamma-butyrolactone homogeneously distributed therein, was manufactured according to the process of the invention described in the aforementioned copending U.S. application Serial No. 715,394 now U.S. Patent 2,953,818. This roll of film was stretched first longitudinally and then transversely. The apparatus used was composed of two main parts, namely, a longitudinal stretching section and a transverse stretching section. The longitudinal stretching section was composed of two horizontally mounted pairs of contra-rotating nip rolls in parallel arrangement. Each pair of nip rolls consisted of one rubber roll and one metal roll. Longitudinal stretching of the film took place in the space between the first pair of nip rolls and the second pair, caused by the fact that the latter-named rotated at a greater peripheral speed. The extent of longitudinal elongation is determined by the difference between the peripheral speeds of the "slow" and "fast" nip rolls. The two metal rolls in the longitudinal stretching section were heated internally.

The film now traveled from the "fast" rolls of the longitudinal stretching section into the transverse stretching section of the apparatus. This consisted chiefly of an enclosed tenter frame having an endless chain of tenter clips on both sides of the film. Throughout its passage through the transverse stretching section, the film maintained a linear speed equal to the peripheral speed of the "fast" rolls of the longitudinal stretching section. As the film emerged from the longitudinal stretching section, it was directed between parallel rows of tenter clips, which clips grasped the edges of the film and were then caused to move outward by diverging guide rails, thus stretching the film transversely. When the film reached the point at which it had been stretched transversely to the desired extent, the guide rails again became parallel. The film elongated transversely smoothly, showing no tendency to line drawing or fibrillation.

The first or preheating zone of the transverse stretching section comprises the distance between the "fast" roll end of the longitudinal stretching section and the point where the tenter clips begin to diverge and stretch the film transversely. The second or stretching zone comprises the section in which the tenter clips are actually diverging. The third or drying zone is that section immediately following the stretching zone wherein the guide rails of the tenter frame are again parallel, and substantially all of the remaining solvent is removed from the film while it is maintained under transverse tension.

The extent of transverse direction elongation can be determined by the difference between the film width entering the tenter frame and that exiting. The film was allowed to relax after longitudinal stretching. Longitudinal or machine direction relaxation was accomplished by running the tenter clip chain at a lineal speed slower than the peripheral speed of the "fast" rolls of the longitudinal stretching section.

In this example the metal rolls in the longitudinal stretching section were maintained at 75° C., and the air in the preheating and stretching zones of the transverse stretching section of the equipment was maintained at 90° C. The "slow" rolls of the longitudinal stretching section rotated at a peripheral speed of 11.5 lineal feet per minute while the "fast" rolls rotated at a peripheral speed of 32.2 lineal feet per minute. The film leaving the "fast" rolls was about 10 inches wide and had been elongated 180%, and contained about 53% gamma-butyrolactone by weight. The film now entered the transverse stretching section of the equipment, from which it exited 24 inches wide at the rate of 30 feet per minute. In both longitudinal and transverse directions, the film elongated smoothly and uniformly, showing no tendency to either line drawing or fibrillation. Film exiting from the transverse stretching zone contained about 15% gamma-butyrolactone. Solvent evolution in the drying zone was accomplished by exposing the film for about 40 seconds to air maintained at approximately 190° C. The 30 feet per minute speed of the tenter frame clip chains permitted a small longitudinal relaxation to occur between the "fast" rolls of the longitudinal stretching section and the preheat zone of the transverse stretching equipment. The net longitudinal elongation of the film produced was 160%. From the width of film entering and leaving the transverse stretching equipment, the transverse elongation is calculated as 140%.

Some properties of the resulting biaxially elongated, 1 mil thick polyvinyl fluoride film are shown below in Table I. This film was also checked for thickness uniformity across its width and measured 1.04 mils±12% variation. The originally cast film had gauged 13.9 mils±5% variation. Gauge magnification for this stretching operation was determined by dividing the percent variation of the final film by that of the cast film; i.e., $$\text{Gauge magnification} = \frac{12\%}{5\%} = 2.4$$

*Table I*

Tensile strength, p.s.i.:
   M.D. ---------------------------------- 22,000
   T.D. ----------------------------------- 14,000
Elongation, percent:
   M.D. ---------------------------------- 75
   T.D. ----------------------------------- 132
Tensile modulus, p.s.i:
   M.D. ---------------------------------- 320,000
   T.D. ----------------------------------- 270,000

The process of this invention makes possible, for the first time, the production of polyvinyl fluoride film of exceptionally high property level in an integrated and continuous manner. It provides a means of realizing the high levels of utility latent in polyvinyl fluoride film, especially film comprising relatively high molecular weight polymer. The process of this invention further provides for continuous biaxial stretching of orientable polyvinyl fluoride film, heretofore impossible. This is accomplished on standard types of commercial process equipment and without thermally degrading the polymer.

EXAMPLE 2

A series of 10-inch wide (excluding edge beads) rolls of orientable polyvinyl fluoride film, about 25.3 mils thick containing about 58.5% by weight (based on the total weight of film) of gamma-butyrolactone homogeneously distributed therein and also containing about 23% by weight of rutile titania (based on the total solids) was manufactured according to the process of the invention described in U.S.P. 2,953,818. Each roll in turn was placed on a conventional unwind reel, from which it was continuously fed at the rate of 10 feet per minute into the previously described longitudinal stretching apparatus. For Example 2 and corresponding control runs, driven nip rolls as in Example 1 were used in the longitudinal stretching apparatus. For these runs, the "slow" rolls and corresponding nip rolls rotated at the peripheral speed of 10 feet per minute while the "fast" rolls and corresponding nip rolls rotated at the peripheral speed of 26 feet per minute. In each of these runs, the film elongated smoothly and uniformly with no evidence of line drawing. The extent of longitudinal elongation may be determined as follows:

$$\text{Percent elongation} = \frac{100(26-10)}{10} = 160\%$$

or, in other words, a longitudinal (machine) direction stretch of 2.6×. During this phase of the operation, all of the rolls in the longitudinal stretching apparatus were internally heated and maintained at a temperature within the range of 70–80° C. The films exiting the longitudinal stretching apparatus contained approximately 53% gamma-butyrolactone by weight (solvent-containing basis) and were about 9 inches wide (excluding edge beads).

The film now traveled from the "fast" rolls of the longitudinal stretching apparatus into the transverse stretching and drying apparatus. The guide rails of the tenter frame were arranged according to permit some lateral relaxation during the final half of the drying stage in Zone 3. The speed of the tenter chains for this series of runs was maintained at 24 feet per minute, thereby permitting a small amount of longitudinal direction relaxation by virtue of the speed differential between the "fast" rolls and the tenter chains. The angle of guide rail divergence in the transverse stretching section of the apparatus was chosen to produce a transversely stretched film having a bead-free width of about 25 inches. In this series of runs the films elongated in both directions smoothly and uniformly, showing no tendency to either line drawing or fibrillation. The extent of transverse elongation may be determined as follows:

$$\text{Percent elongation} = \frac{100(25-9)}{9} = 178\%$$

or, in other words, a transverse direction stretch of about 2.8×. Over the last 20 feet of the drying zone, the guide rails converged slightly, permitting the film to relax transversely to a bead-free width of about 24 inches as it was dried to a solvent-free condition and heat-set. The guide rails again became parallel at the cooling section of the tenter frame, following which the beads were slit off and a series of tough, biaxially oriented, nominally two-mil thick polyvinyl fluoride films were wound-up.

In the following table are shown the air supply temperatures to the different zones of the transverse stretching and drying apparatus, the transverse direction gauge (i.e., thickness with specified variation) of each cast film and its corresponding final solvent-free film, the solvent content of each film at the end of the transverse stretching phase of the operation and the T.D. gauge magnification (i.e., the worsening of T.D. gauge variation) demonstrated by the finished films.

The solvent content of each film at the end of the transverse stretching phase of the operation was determined by stopping the apparatus during each run after uniform operation had been attained and quickly removing a full width strip of film (less beads) about an inch or two inches wide at the point in the tenter frame where the guide rails became parallel at the end of the transverse stretching configuration. This strip was quickly placed in a previously tared container, weighed, placed in a drying oven and dried to a constant weight. The solvent content (wet basis) was determined by the following formula:

Percent solvent $$= \frac{100 \text{ (original sample weight} - \text{final sample weight)}}{\text{original sample weight}}$$

The critical solvent content of a gamma-butyrolactone containing polyvinyl fluoride film is 13% by weight.

Progressing through the series of control runs A and B eventually to the run represented by Example 2, it can be seen that T.D. gauge magnification diminished as the rate of solvent evolution during stretching was increased and was actually at its best (Example 2) when the rate of solvent evolution during transverse stretching was such that transverse stretching terminated just as the solvent content of the film reached approximately to the critical level, that is the solvent content at the point where evaporative mechanisms cease to control the rate of solvent evolution and diffusional and other mechanisms begin to predominate or, in other words, at the transition between the constant rate period and the falling rate period.

In control run C, solvent evolution during at least the first portion of transverse direction stretching proceeded at a higher rate than in Example 2 or any of control runs A or B. The corresponding portion of transverse direction stretching took place along a resultant stress-strain curve steeper even than that for Example 2. However, at some point during transverse direction stretching, the solvent content of the film fell below the critical level and the film entered the falling rate drying period. Because the rate of solvent evolution now fell off rapidly, the latter portion of transverse direction stretching took place on a rapidly flattening stress-strain curve (i.e., one of decreasing slope), the resulting gauge magnification more than erasing any retardation of gauge magnification that might have occurred during the constant rate portion of transverse direction stretching.

The results of a physical property evaluation on the final solvent-free polyvinyl fluoride film of Example 2 appear in the following table, Table II.

*Table II*

Property:
  Tensile Strength, p.s.i.:
    M.D. _____ 14,500
    T.D. _____ 13,500
  Elongation, percent:
    M.D. _____ 105
    T.D. _____ 115
  Tear Strength, g./mil:
    M.D. _____ 20
    T.D. _____ 22
  Tensile Modulus, p.s.i.:
    M.D. _____ 270,000
    T.D. _____ 260,000
  Impact Strength, kg.-cm./mil _____ 5.2
  Accelerated Weatherability, hours _____ 6,500

EXAMPLE 3

Three 10.5-inch wide (excluding edge beads) rolls of orientable polyvinyl fluoride film nominally about 13 mils thick and containing about 60% by weight (based on the total weight of film) of N,N-dimethylacetamide homogeneously distributed therein were manufactured according to the process of the invention described in U.S. Patent 2,953,818. These rolls of film were stretched first longitudinally and then transversely, followed by drying to a substantially solvent-free condition. For Example 3

EXAMPLE 2

| Run Identification | Temperature of Air Supplied, °C. | | | Solvent Content at end of Transverse Stretching, Percent | T.D. Film Gauge, Mils±Percent Variation | | T.D. Gauge Magnification |
|---|---|---|---|---|---|---|---|
| | Zone 1 | Zone 2 | Zone 3 | | Solvent-Containing, as Cast | Solvent-Free After Two-Way Stretching and Drying | |
| Control A__ | 70 | 70 | 190 | 32.4 | 23.2±5.6 | 2.03±19.7 | 3.5 |
| Control B__ | 90 | 90 | 190 | 31.4 | 23.4±5.2 | 2.00±15 | 2.9 |
| Example 2_ | 130 | 130 | 190 | 12.6 | 23.2±5.0 | 1.83±10.9 | 2.2 |
| Control C__ | 150 | 150 | 190 | 6.6 | 23.8±5.4 | 1.98±16.7 | 3.1 | and corresponding control runs, driven nip rolls were used in longitudinal stretching apparatus as in Example 2 and the longitudinal (machine) direction stretch ratio was maintained at 1.8× (i.e., 80% longitudinal elongation) by controlling roll speed differentials. The films leaving the longitudinal stretching apparatus ranged in solvent content from about 53.5% to 55.5% by weight (solvent-containing basis) and measured 9 inches wide, excluding edge beads. The temperature of the rolls in the longitudinal stretching apparatus was varied within the range of 65° C. to 75° C., inversely with roll speed in an effort to maintain solvent evolution during longitudinal stretching fairly constant from run to run.

These longitudinally stretched films then passed continuously into the transverse stretching and drying apparatus wherein they were stretched transversely to a bead-free width of 23 inches, with the tenter frame arranged so that no lateral relaxation was permitted during drying and heat-setting. For Example 3 and corresponding control runs, the temperature of the air supplied to Zones 1 and 2 was maintained at 120° C. while that supplied to Zone 3 was maintained at 185° C. The amount of latent solvent evolved from the film during transverse stretching was varied by varying the speed of the tenter chains from run to run. The "fast" rolls were driven at the same peripheral speed as the lineal speed selected for the tenter chains, with the "slow" roll speed proportionately reduced to produce a longitudinal stretch ratio of 1.8× for each run.

In Example 3 and its corresponding control runs the films elongated smoothly and uniformly in both the longitudinal and transverse directions, showing no tendency to either line drawing or fibrillation.

The solvent content of each film leaving the transverse stretching phase of the operation was determined by stopping the apparatus during each run after uniform operation had been attained and quickly removing a full width strip of film (less beads) about an inch or two inches wide at the point in the tenter frame where the guide rails became parallel at the end of the transverse stretching configuration. This strip was quickly placed in a previously tared container, weighed, placed in a drying oven and dried to a constant weight. Solvent content was determined by the following formula:

$$\text{Percent solvent} = \frac{100 \, (\text{original sample weight} - \text{final sample weight})}{\text{original sample weight}}$$

In the following table are shown tenter chain speeds and corresponding longitudinal stretching section roll speeds, solvent contents at the end of transverse stretching, transverse direction gauge and variation thereof for each solvent-containing cast film and its corresponding two-way stretched, solvent-free film and the corresponding transverse direction gauge magnification realized as a result of the stretching operation.

content of the film reached the critical level, that is, the solvent content at the point where evaporative mechanisms cease to control the rate of solvent evolution and diffusional and other mechanisms begin to predominate or, in other words, at the transition between the constant rate period and the falling rate period.

In Control Run A', solvent evolution during transverse stretching occurred at a lower rate than that for Example 3 and consequently the resultant stress-strain curve along which transverse stretching took place was not as steep as it could have been and gauge magnification was correspondingly worse.

In Control Run B', solvent evolution during at least the first portion of transverse direction stretching proceeded at a higher rate than in Example 3. The corresponding portion of transverse direction stretching took place along a resultant stress-strain curve steeper even than that for Example 3. However, at some point during transverse direction stretching, the solvent content of the film fell below the critical level and the film entered the falling rate drying period. Because the rate of solvent evolution now fell off rapidly, the latter portion of transverse direction stretching took place on a rapidly flattening stress-strain curve (i.e., one of decreasing slope), the resulting gauge magnification more than erasing any retardation of gauge magnification that might have occurred during the constant rate portion of transverse direction stretching.

The results of a physical property evaluation on the final solvent-free, biaxially oriented polyvinyl fluoride film of Example 3 appear in the following table, Table III.

*Table III*

Property:
- Tensile Strength, p.s.i.:
  - M.D. _____ 18,000
  - T.D. _____ 18,000
- Elongation, percent:
  - M.D. _____ 99
  - T.D. _____ 96
- Tear Strength, g./mil:
  - M.D. _____ 10
  - T.D. _____ 9
- Tensile Modulus, p.s.i.:
  - M.D. _____ 290,000
  - T.D. _____ 300,000
- Impact Strength, kg.-cm./mil _____ 6.6
- Accelerated Weatherability, hours _____ 1,200

We claim:
1. A process for preparing an oriented polyvinyl fluoride film which comprises continuously stretching in two mutually perpendicular directions, at least 50% but not more than 500% in either direction, a latent solvent-containing film of a polyvinyl fluoride having an inherent viscosity of at least 0.5, said film containing, prior to transverse stretching, at least 26% by weight of a latent

EXAMPLE 3

| Run Identification | Longitudinal Stretching | | | Tenter Chain Speed, ft./min. | Solvent Content at End of Transverse Stretching, Percent | T.D. Film Gauge, Mils±Percent Variation | | T.D. Gauge Magnification |
|---|---|---|---|---|---|---|---|---|
| | Roll Temp., °C. | "Slow" Roll Speed, ft./min. | "Fast" Roll Speed, ft./min. | | | Solvent Containing, as Cast | Solvent-Free After Two-Way Stretching and Drying | |
| Control A' | 75 | 50 | 90 | 90 | 24.8 | 13.0±4.2 | 1.08±13.9 | 3.3 |
| Example 3 | 70 | 41.6 | 75 | 75 | 13.8 | 12.9±3.7 | 1.06±7.8 | 2.1 |
| Control B' | 65 | 11.7 | 21 | 21 | 2.9 | 12.95±5.8 | 1.04±18.0 | 3.1 |

It will readily be seen from observation of the data presented in the foregoing table that transverse direction gauge magnification was optimum when the rate of solvent evolution during transverse direction stretching was such that this stretching operation terminated as the solvent solvent for polyvinyl fluoride, based on the total weight of the film; evolving latent solvent therefrom during transverse stretching until the amount of latent solvent remaining in the film after transverse stretching constitutes between 9% and 17% by weight, based on the total weight;

and, thereafter, drying said film to remove substantially all of the latent solvent therefrom.

2. The process of claim 1 wherein said latent solvent-containing film contains, prior to transverse stretching, from 35% to 70% by weight of a latent solvent for polyvinyl fluoride.

3. The process of claim 1 wherein the inherent viscosity of the polyvinyl fluoride is between 1.0 and 3.5.

4. The process of claim 1 wherein stretching is carried out at a temperature of from 20° C. to 150° C.

5. The process of claim 1 wherein the latent solvent is selected from the group consisting of gamma-butyrolactone, N,N-dimethylacetamide, N,N-dimethylformamide, dimethylsulfoxide, N-methyl-2-pyrollidone and gamma-valerolactone.

6. A process for preparing an oriented polyvinyl fluoride film which comprises stretching continuously first in the longitudinal direction at least 50% but no more than 500%, and thereafter in a direction perpendicular to the first direction of stretch, at least 50% but no more than 500%, a latent solvent-containing film of a polyvinyl fluoride having an inherent viscosity of at least 0.5 simultaneously evolving latent solvent from the film and stretching in the direction perpendicular to the first direction of stretch from a latent solvent content of at least 26% to a critical content between 9% and 17%; and thereafter drying said film to remove substantially all of the latent solvent therefrom.

7. The process of claim 6 wherein the latent solvent is gamma-butyrolactone and the critical content is about 13%.

8. The process of claim 6 wherein the latent solvent is N,N-dimethylacetamide and the critical content is about 13%.

9. The process of claim 6 wherein said latent solvent-containing film contains, prior to stretching in the direction perpendicular to the first direction of stretch, from 35% to 70% by weight of a latent solvent for polyvinyl fluoride.

10. The process of claim 6 wherein the inherent viscosity of the polyvinyl fluoride is between 1.0 and 3.5.

11. The process of claim 6 wherein stretching is carried out at a temperature of from 20° C. to 150° C.

12. The process of claim 6 wherein the first direction of stretch is carried out at a temperature of from 20° C. to 100° C., and the second direction of stretch is carried out at a temperature within the range of from 60° C. to 150° C.

13. The process of claim 6 wherein the stretched film is dried under tension sufficient to prevent shrinkage of the film.

14. The process of claim 6 wherein the stretched film is allowed to shrink up to 35% of the elongation imparted to the film by stretching.

References Cited in the file of this patent

UNITED STATES PATENTS

| | | |
|---|---|---|
| 2,810,702 | Bechtold et al. | Oct. 22, 1957 |
| 2,824,780 | Satterhwaite | Feb. 25, 1958 |
| 2,846,727 | Bechtold | Aug. 12, 1958 |
| 2,953,818 | Bartron | Sept. 27, 1960 |
| 3,081,208 | Bottorf et al. | Mar. 12, 1963 |